INVENTOR
WILLIAM G. SMITH

BY
ATTORNEY

INVENTOR
WILLIAM G. SMITH
BY *Gary V. Hammitt*
ATTORNEY

United States Patent Office 3,526,001
Patented Aug. 25, 1970

3,526,001
PERMEATION SEPARATION DEVICE FOR
SEPARATING FLUIDS AND PROCESS
RELATING THERETO
William G. Smith, Pennsville, N.J., assignor to E. I. du
Pont de Nemours and Company, Wilmington, Del., a
corporation of Delaware
Filed Nov. 26, 1968, Ser. No. 779,006
Int. Cl. B01d 13/00
U.S. Cl. 210—23                                10 Claims

ABSTRACT OF THE DISCLOSURE

A permeation separation apparatus which comprises an elongated jacket containing therein a plurality of long, thin, hollow, selectively permeable fibers which extend substantially the length of said jacket and which form a U-shaped loop at one end of said jacket so that both ends of each fiber extend through the opposite end of the jacket into a receiving chamber. The fibers form a bundle that is positioned such that the outer-most portion of the bundle are spaced away from the interior wall of the jacket. A perforated tube extends through at least one end of said jacket and is positioned within the fiber bundle along the approximate center axis of the bundle for substantially the length of the bundle. The perforations of the tube are spaced around its circumference and along the length of the portion of the tube within the bundle. The jacket and the chamber each contain fluid conduit means.

BACKGROUND OF THE INVENTION

Field of the invention

This invention relates to an apparatus and method for uniformly contacting bundles of long, thin, selectively permeable hollow fiber membranes with a fluid mixture or solution in order to separate the mixture or solution by passing permeable components of the mixture or solution through the membrane.

Description of the prior art

Hollow tubes have long been used for separation or purification of components of liquids and gases. U.S. Pat. 2,411,238 to Zender describes an aqueous dialysis in an apparatus of tubular membranes of pipe size. U.S. Pat. 2,961,062 to Hunter and Hickey shows collections of palladium capillary tubes for separating hydrogen from other gases. U.S. Pat. 2,972,349 to De Wall shows capillary tubes used for oxygenating blood in an artificial lung.

Long, thin, permeable hollow fibers prepared from organic polymers have been found to be useful in permeation separation apparatus by employing the propensity of the fibers to pass one fluid through the fiber walls more easily than other fluids, ions or ingredients. For example, Mahon U.S. Pat. 3,228,877 discloses a permeation separation apparatus composed of a cylindrical jacket containing a multitude of small-diameter, selectively permeable hollow fibers. The fibers extend longitudinally the length of the jacket and through each capped end of the cylinder. The fluid feed mixture is admitted under pressure to the jacket interior where the component desired to be separated passes through the walls of the hollow fibers, down the interior of the hollow fibers, to a collecting vessel. The remainder of the fluid mixture still inside the jacket is drawn off through an outlet port in the jacket.

Another type of permeation separation device which utilizes selectively permeable hollow fibers is described in British Pat. 1,019,881. This device operates in the same manner as the Mahon device, supra, but the configuration of the fibers within the jacket is different. The hollow fibers do not extend the length of the cylinder and emerge at both ends, as they do in the Mahon patent, but rather, the fibers extend the length of the cylinder and are then doubled or looped back the length of the cylinder again so that both ends of the hollow fibers emerge from the same end of the cylindrical jacket. In other words, the hollow fibers form a U inside the jacket with the bottom or looped portion of the fiber at one end of the cylinder and the two ends of the fiber emerging from the other end.

Still another type of permeation separation device is described in McCormack, U.S. Pat. 3,246,764 where the fibers are positioned longitudinally within the cylinder such that one end of each hollow fiber emerges through one end of the cylinder, while the other end of each fiber is sealed off to prevent communication between the interiors of the hollow fibers and the interior of the cylinder. Still other permeation sepaartion embodiments are described in Maxwell et al. U. S. Pat. 3,339,341.

The foregoing art patents disclose that, in general, the permeation devices are manufactured by fabricating the hollow fibers (as described, e.g., in Breen et al., U.S. Pat. 2,999,296; or British Pats. 514,638, 843,179 or 859,814), positioning them longitudinally into a long, closely packed bundle, casting the ends of the fibers in the bundle in a solidifiable liquid resin (usually epoxy) so that upon solidification the long, closely packed bundle is fixed at its ends, while taking steps to ensure that the openings of the hollow fibers in the bundle are not plugged by resin, and placing the closely packed bundle into a cylindrical jacket. Such procedures are described in detail in Maxwell et al. U.S. Pat. 3,339,341, and Mahan U.S. Pat. 3,228,877.

Polymeric materials from which the hollow fibers are made are disclosed in the above-identified patents and include polyethylene terephthalate, polyvinyl chloride, polyvinylidene chloride, polyhexamethylene adipamide, copolymers of tetra fluoroethylene and hexafluoropropylene, cellulose acetate, ethyl cellulose, polystyrene, copolymers of butadiene and styrene, cellulose esters, cellulose ethers, acrylonitriles, polyvinyl formals and butyrals, polyolefins, polyurethanes, polyamides and the like.

However, the means by which the fluid mixture or solution is introduced into the jacket containing the above-described hollow fibers or tubes does not provide a flow of the fluid mixture or solution which allows maximum contact between the fluid and the fibers or tubes. Maximization of contact is, of course, desirable since the efficiency of the separation to be carried out is dependent thereon, i.e., the effective distribution of fluid feed mixture or solution within the completely assembled device so that the fluid contacts a maximum amount of outer-surface area of the hollow fibers to allow permeation of the desired component, has long been a problem. One means employed in an attempt to overcome the problem of obtaining maximization of contact between the fluid feed and the outer surface of the hollow fibers has been to place a perforated exit tube in the center of the hollow fiber bundle so that the tube is positioned within the fiber bundle along approximately the center axis of the bundle and extending substantially the longitudinal length of the bundle. The tube provides the only outlet for the fluid reject (the portion of the fluid not permeating through the walls of the hollow fibers). The feed fluid enters the interior of the permeation jacket through a suitable conduit and, by proper spacing of the perforations on the perforated exit tube, is forced to flow toward the center of the bundle in order to exit from the jacket. This device causes the fluid to flow in a semi-radial direction (i.e., to flow across the hollow fibers as well as down the channels (spaces) between the longitudinal length of the hollow fibers.

3

It is an object of this invention to obtain essentially radial flow of the feed fluid along substantially all portions of the hollow fibers in order to obtain maximization of contact between the feed fluid and the hollow fibers.

SUMMARY OF THE INVENTION

A permeation separation apparatus for separating components of a fluid, which apparatus comprises in combination, (A) an elongated fluid-tight jacket, having an open first end and a second end closed by said jacket,
  said first end closed by a fluid-tight cast wall member;
(B) a plurality of hollow fibers positioned longitudinally within said elongated jacket,
  said fibers extending substantially the length of said jacket and forming a loop adjacent the second closed end of said jacket with both ends of each of said fibers embedded in and extending through said cast wall member in fluid-tight relationship thereto,
  said fibers comprising a bundle surrounded by at least one elongated flexible porous sleeve member extending longitudinally the substantial length of said bundle, said bundle substantially filling the interior of said jacket;
(C) an outer closure member cooperating with said jacket and said cast wall member which, with said cast *wall* member, defines a chamber that is in communication with the open ends of each hollow fiber;
(D) a multiply perforated tube extending through at least one end of said jacket in fluid-tight relationship thereto, said tube positioned within said bundle along approximately the center axis of said bundle and extending substantially the longitudinal length of said bundle,
  the perforations of said perforated tube being spaced around the circumference of said tube and along the length of the portion of said tube that is within said bundle,
  said tube constructed and arranged such that its interior communicates with the interior of said jacket only at the opening provided by said perforations, and such that its interior does not communicate with the chamber defined by said outer closure member and said cast wall member;
(E) said jacket having conduit means to permit movement of fluid between the interior of said jacket and an area outside said jacket; and
(F) said outer closure member having conduit means to permit movement of fluid out of the chamber defined by said outer closure member and said cast wall member.
(G) said fiber bundle positioned within said jacket such that the elongated flexible porous sleeve surrounding said fibers is spaced uniformly away from the interior walls of said jacket.

DESCRIPTION OF THE INVENTION

Figure 1:
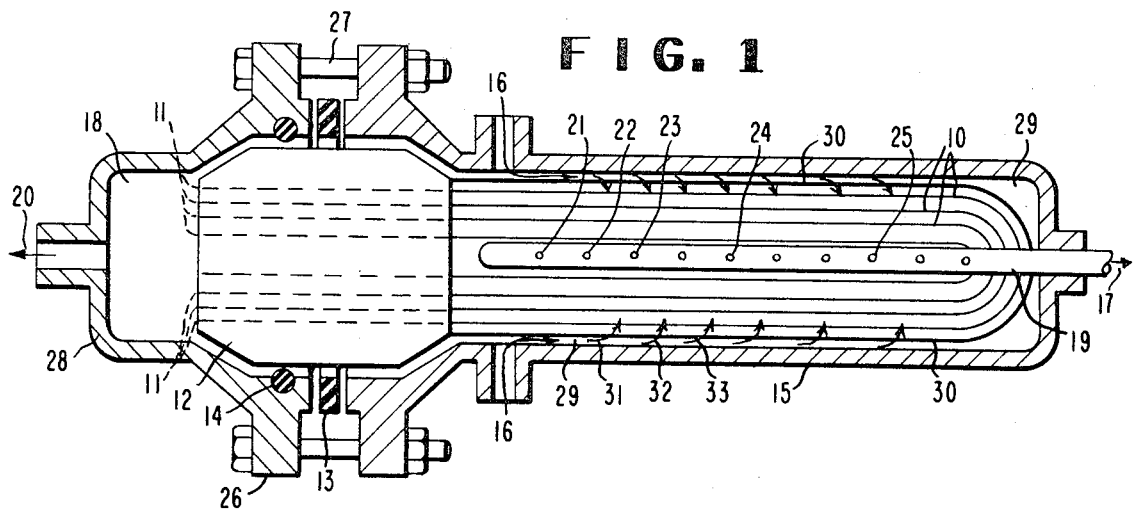
FIG. 1 is a longitudinal cross-sectional view of one embodiment of a permeation separation apparatus of this invention.

Hitherto, permeation separation devices described in the art have required that hollow fibers be packed tightly into a jacket with means for introducing a fluid feed (typically a naturally occurring water which contains dissolved salts such as sodium sulfate, sodium chloride, magnesium chloride, magnesium sulfate or many others in various proportions, or a gas mixture) at a point near one end of the fiber bundle under pressure. In the case of such aqueous solutions, water passes through the walls of the hollow fibers more rapidly than will the dissolved salts. Purified water solution then exits from the open ends of the hollow fibers, and the remaining solution, having been rejected by the fiber walls, is enriched in the dissolved salts, and is allowed to exit from the jacket, as for example, through the exit ports in the perforated exit tube. Such permeation devices have been constructed and tested in sizes from fractions of an inch in diameter to 12″ and 14″ in diameter, or more. Among the materials which have been suggested for use in hollow fiber permeation devices are polystyrene, polyethylene, polyethylene terephthalate, polyvinyl chloride, polyvinylidene chloride, polyhexamethylene adipamide, polyacrylonitrile, ethyl cellulose, cellulose propionate, copolymers of tetrafluoroethylene and hexafluoropropylene, copolymers of acrylonitrile and vinyl chloride, and copolymers of butadiene, styrene, polyamides and modified polyamides. The effectiveness of very small permeation devices using very thin hollow fibers is usually significantly superior to similar large-size devices using such hollow fibers. This reduction in efficiency of the large-size devices is attributed to the engineering problem of ensuring that the outside surface area of the small-diameter hollow fibers in the device is contacted with the feed fluid. The available surface area in a permeation device of the type described in U.S. Pat. 3,339,341 is very large, reaching in a 12″ diameter apparatus as much as 75,000 to 100,000 sq. ft. In the same patent, the ideal flow conditions for fluid treatment with this kind of permeation device are outlined, flow being visualized as occurring mainly in the narrow channels defined by the juxtaposed outer surfaces of the hollow fibers. In practice, considerably less than ideal flow conditions prevail for a number of reasons. Some flow channels may be blocked, by foreign matter, deformed fibers or other reason. Open channels at the side of the bundle may allow flow from inlet to outlet without proper contact of feed fluid with fiber surface. When flow is excessively restricted, the amount of salt left in the narrow flow channels may rise to the point of precipitation, which further restricts flow and compounds the difficulty of maintaining good flow patterns.

The difficulties described above are overcome by this invention which eliminates the necessity for flow of feed fluid down the narrow channels between the hollow fibers and induces cross flow throughout the bundle. This is accomplished, firstly, by providing a perforated exit tube within the bundle in which the perforations comprise fluid exit ports at a number of points along the length of the tube that is within the hollow fiber bundle. The tube provides exitway for the fluid rejected by the hollow fibers and is inserted in the middle of the fiber bundle or at least well within its outer circumference. The tube may be fixed at either end of the permeation device or at both ends, so long as passage is allowed for the fluid reject from the inside of the jacket. The performated tube will be referred to hereinafter either as such or as the reject exit tube or reject collection tube.

Elimination of the necessity for flow of feed fluid down the narrow channels between the hollow fibers is accomplished, secondly, by providing an annular space or ring between the interior wall of the jacket and the outer surface of the elongated sleeve surrounding the fibers. The annulus (or annular ring) being empty space, is essentially a zone of low-pressure drop. Thus feed fluid entering the jacket through a suitable inlet tends to fill the annular space before penetrating into the fiber bundle. Pressure from the feed entering the jacket then forces the feed fluid in the annulus radially inward (across the hollow fibers) to the exit ports spaced along the perforated exit tube. In this arrangement, flow along the longitudinal channels between the hollow fibers is minimal. Uniform radial flow is achieved by evenly spacing the exit ports along the perforated exit tube. Thus maximum contact between fluid feed and fibers is obtained.

FIGS. 1–5 depict various embodiments of the apparatus of this invention. Referring now to FIG. 1 which represents a preferred embodiment of the invention, a hollow fiber bundle containing a plurality of individual hollow fibers 10 is positioned inside jacket 15. The fibers are surrounded by a flexible porous sleeve 30. The fibers are looped at one end of the jacket so that both ends of each fiber extend through cast wall block 12 and open into chamber 18 at 11. Chamber 18 is formed by outer closure member 28 which is constructed to abut portions of the cast wall 12 and jacket 15, and is rigidly attached thereto by flanges 26 and bolts 27. Gasket seal 13 and O-ring 14 provide fluid-tight seals. A feed fluid is introduced at 16 through jacket 15 under pressure and flows along annular ring space 29 between the outer fiber bundle sleeve 30 and the interior wall of jacket 15. Once the annular space 29 is filled with fluid the feed flows radially (perpendicularly) across the fibers as represented by arrows, some of which are denoted by 31, 32 and 33, toward the exit perforations, some of which are denoted by 21, 22, 23, 24, and 25, along perforated exit tube 19. All of the reject fluid (fluid remaining after the permeate has passed through the fiber walls) must exit through these perforations and thence to exit 17 where a pressure let-down device (not shown) allows it to leave the apparatus at atmospheric (or other desired) pressure. The permeate having penetrated the fiber walls flows through the hollow fiber interiors and exits from the open fiber ends at 11 into chamber 18 and leaves the chamber at exit 20.

The presence of the annular ring and evenly spaced perforations has the effect of forcing cross-flow (flow of entrance fluid perpendicular to the longitudinal axis of the hollow fibers) to provide mixing in a radial direction (a direction perpendicular to the length of the fibers) of fluid within the jacket, thus alleviating the effects of blanked flow paths and pockets of no-flow in the axial direction (along the axis of the fibers). In this way, efficient use is made of the maximum amount of fiber surface. Thus a pluggage that could occur in a channel between hollow fibers in a permeation separation apparatus that does not contain the perforated tube or annular ring would cause a decrease in efficiency since fiber walls below the stoppage or pluggage point would not be contacted by the feed fluid. However, the radial flow pattern in the apparatus of this invention provides movement of fluid across the fibers so that the stoppage point is by-passed.

The jacket of the apparatus may be made with any suitable transverse cross-sectional configuration and of any suitable compatible material of sufficient strength. Preferably the jacket is cylindrical. Cylindrical metallic housings, for example, steel pipe, are satisfactory, being reasonably easy to produce and assemble. The size of the tubular jacket may vary from less than one inch to many inches in diameter, e.g., 10 or 14 inches, and may vary from about one to many feet in length, e.g., 10 or 14 feet.

An idea of the construction of the hollow fibers is indicated by the fact that in a jacket that is about six inches in diameter and eight feet long, about twelve million hollow fibers have been packed therein to result in an effective membrane surface (outer walls) of about 20,000 square feet.

The hollow fibers may be prepared by melt extrusion through circular dies and spinnerets as taught in French Pat. 990,726 and British Pat. 859,814. Hollow fibers of textile size are preferably made by melt spinning the polymer, e.g., nylon 66 with a screw melter, a sand filter pack, and a sheath-core spinneret of the type shown in U.S. Pat. 2,999,296. Fibers of suitable size are obtained with spinnerets having plate hole diameters near 40 mils and insert diameters near 35 mils by adjustment of melter, sand pack, and spinneret temperatures, air quench and wind-up speed.

The hollow fibers useful herein generally have outside diameters of about 10–250 (preferably 15–150) microns and wall thicknesses of about 2–75 (preferably 5–40) microns. In general, the fibers with smaller outside diameters should have thinner walls so that the ratio of the cross-sectional area of the internal bore of the fiber to the total cross-sectional area within the outer perimeter of the fiber is about 0.12–0.60; i.e., about 0.12:1 to 0.60:1. Preferably the ratio is about 0.18–0.45 to 1. The composition of the fibers has been discussed above. Preferably the fibers are polyamide fibers modified as described in U.S. patent applications Ser. Nos. 674,425 now abandoned and 674,569, now U.S. Pat. No. 3,497,451 both filed Oct. 11, 1967, or Ser. No. 757,272, now abandoned filed Sept. 4, 1968. Exemplary modification includes modification with protonic acids (e.g, formic) or lyotropic salts and the like, as described more fully in said applications.

It has been found that the most convenient configuration of the hollow fibers inside the jacket is that wherein the fibers form a U-shape, as shown in the figures, so that both ends of the fibers exit from the jacket at the same end thereof. Such a configuration can be conveniently obtained by spinning or extruding the hollow fiber into one continuous yarn or filament which is wound to form a hank of a desired length and width (which will depend upon the length and width of the jacket). The preparation of the hanks is described in detail in U.S. Pat. 3,339,341. The hanks are drawn and elongated by means of hooks and a flexible porous sleeve or sleeves pulled over the elongated hank to aid in subsequent handling of the fiber bundle.

The flexible porous sleeves which are drawn over the loose hanks may be made of any suitable material, natural, reconstituted, or synthetic, of suitable strength and compatible with the fluid mixture being handled, the polymer from which the hollow filaments are made, the material forming the cast wall members, and the other materials with which the sleeve will come in contact. The sleeve members may be of any practical construction which is porous and flexible. Preferably the sleeve members should be of a strong abrasion resistant material, or a construction, which is capable of shrinkage or shortening at least in the transverse peripheral dimension to give a uniform constraining compacting action on and along an enclosed bundle or group of filaments. A preferred construction is a circularly knit fabric sleeve of a suitable material such as cotton thread or a polyester fabric, for example, which sleeve is capable of considerable reduction in transverse peripheral dimension when the sleeve is placed under tension longitudinally. This sleeve is especially advantageous, for when tension is exerted on such a sleeve surrounding a bundle to pull a filament bundle into a tubular jacket, the tension also results in uniformly compacting and reducing the bundle cross section along the bundle length to facilitate positioning the bundle in such a jacket without flattening or damaging the filaments of the bundle. The sleeves may also be made of woven or non-woven fabric, or of punched or cut cylindrical tubes of netting. The ability of the sleeve member to shrink or reduce its radius or circumference uniformly and evenly is desirable.

Once the sleeve or sleeves are placed around the fiber bundle hank, one end of the hank is placed in a suitable mold while a solidifiable material is molded around that end of the hank to form the cast wall member or block. A suitable molding resin which provides good strength is a mixture of an epoxy polymer modified with butyl glycidyl ether, a modified aliphatic amine adduct and triphenyl phosphite. After solidification, the "potted" hank is removed from the mold. The "pot" or cast wall member can then be sliced or cut, as described in Maxwell U.S. 3,339,341 and Geary et al., Ser. No. 515,535, filed Dec. 22, 1965, now U.S. Pat. No. 3,442,002 so that the open ends of the hollow fibers communicate with the atmosphere.

The cast wall block may be reinforced by providing a metal frame in the form of a spoked wheel or other suitable configuration embedded therein by placing it in the mold used to form the block and then pouring the solidifiable resin into the mold formed by the wheel, and curing. A large variety of plastics such as polyester, phenolics, melamines, silicones and others are suitable as solidifyable resins, although epoxy resin is preferred. The cast wall block is thereafter handled as a unit, the individual bundles of hollow fibers being constrained to a large bundle for ease in handling. The cast wall block may be backed up by a sturdy metal cap of the same diameter if desired which provides increased strength to resist the pressure of the feed fluid inside the jacket of the permeation apparatus. The metal cap is separated from the surface containing the open ends of the hollow fibers by a space such as a screen to allow free flow of the permeate from the fiber openings to the exit conduit of the permeate collection chamber. This type of construction produces a savings of the material used in construction of the epoxy cast wall block, because of the strength provided by the metal frame and/or the metal back-up plate. More effective use is also made of the available hollow fiber surface, as much less of it is sealed inside the cast wall block and more is available for use in permeation separation. The cast wall block is originally of a larger diameter than the jacket making up the body of the apparatus, the connection between the block and jacket being made through a flanged or welded reducer. The looped ends of the bundled fibers (at the end away from the epoxy cast wall block) may be drawn into the jacket, and the other end of the jacket attached to the outer closure member by welding or by flanged fitting.

However, prior to the fitting the fiber bundle in the jacket, the fibers are treated chemically, if desired, as described above and more fully in U.S. patent applications Ser. No. 674,425 now abandoned and 674,569, both filed Oct. 11, 1967.

Also prior to fitting the fiber bundle in the jacket, the perforated tube is inserted longitudinally along the axis of the bundle in about the center of the bundle. Most conveniently a sleeve, of the same construction as the sleeves surrounding the bundle but of a smaller diameter, is placed in the fiber bundle along its longitudinal center axis during formation of the bundle. This sleeve aids in the insertion of the perforated tube since the tube can be inserted inside the sleeve and pushed into the bundle without difficulty by using the sleeve as a guide. The sleeve may be permanently cast in the cast wall block or may be affixed to the tube itself.

The perforated tube may be any suitable length. It will preferably extend into the bundle for almost the length of the fiber bundle the devices of commercial size, i.e., 4″ to 14″ diameter or more, the tube may be of ¼″ to 1″ diameter, or even larger as larger permeation bundles are utilized. The exit ports in the tube may be as small as 1 to 200 microns in diameter, or as large as $\frac{1}{64}$″, $\frac{1}{8}$″ or ¼″ in diameter in larger devices. The perforations in the exit tube must be small enough and few enough to limit flow from the bundle to the inside of the tube. There is some reduction in pressure in passing fluid from the bundle through the exit ports to the bore of the reject exit tube. It is this pressure difference that provides the aspirating action which tends to equalize flow over the length of the bundle and promotes uniform contact throughout. Preferably the perforations are evenly spaced along the portion of the tube within the bundle and are of a uniform size in order to promote even flow of feed fluid radially across all portions of the bundle. The number of perforations is not limited to any maximum number or minimum number. The tube may be fabricated from any material resistant to corrosion, e.g., inert plastic, fiberglass, ceramic wear, or steel. When the perforations are of small size, measured in microns, the tube may be made of linear, high-density polyethylene (having pores 35–100 microns in size) or sintered stainless steel (having pores 1–200 microns in size).

The fibers of the bundle should be packed firmly around the perforated tube. However, if open spaces exist between individual fibers, the effectiveness of the separation device is not greatly affected since the flow is radial.

Preferably, the bundle of fibers is wrapped tightly with the flexible sleeve (although, alternatively, metal cloth tape, rope or screen may be used) and the bundle firmly secured against the perforated exit tube, thus forming a rather stiff unit which leaves an annular space of about $\frac{1}{32}$ to ¾ inch between the interior wall of the jacket and the outermost portion of the fiber bundle. For ultimate performance, perforation spacing may be varied by adjusting for the decrease in driving force caused by increased pressure inside the hollow fibers. Excellent results are obtained by locating 36–40% of the perforations in the top ⅓ of the exit tube, 32–34% of the perforations in the middle ⅓, and 28–30% of the perforations in the bottom ⅓, where reject flow in the tube is from the top toward the bottom. Since the feed fluid completely and uniformly surrounds the hollow fiber bundle, no matter where it is introduced, there is no difference in operation wherever the feed port is located. It may be located at any point on the jacket of the device, or through a concentric tube so long as the feed is introduced to the annulus rather than within the fiber bundle.

In the radial flow created by the apparatus of this invention, flow resistance in the annulus must be small compared to flow resistance in the fiber bundle. Or, to state the foregoing alternatively, the pressure drop (difference in fluid feed pressure at the inlet point and the point in question) must be smaller in the annulus than in the fiber bundle. Moreover, since flow will occur at the regions of greatest pressure drop, the pressure drop will be greatest at the exit ports of the perforated exit tube. Thus, by regulating the size and distance between the exit perforations, fluid flow can be directed and controlled.

Once the tube is in place in the bundle, the bundle is drawn, looped end first, into the jacket. The cast wall block end of the bundle is fitted into the jacket to close that end and the outer closure member fitted to the jacket. Likewise, the portion of the perforated tube protruding from the opposite end of the jacket is sealed to the jacket by welding or suitable flanges and gaskets.

Preparation of the apparatus especially the fibers, cast end block, and procedures of assembly are further described in Maxwell et al. U.S. Pat. 3,339,341 and U.S. application Ser. No. 515,535, now U.S. Pat. No. 3,442,002, filed Dec. 22, 1965.

The apparatus of this invention may be located and operated in a horizontal, vertical, or an intermediate position with respect to ground level. The construction of the apparatus wherein both ends of the fibers are suspended from the single cast wall members, as described herein, offers unusual advantages, especially in gaseous separations, when operated in a vertical position. Gaseous feeds from which hydrogen or other gas is to be separated frequently contain a relatively high proportion of hydrocarbons in the $C_1$ to $C_{10}$ range. Under the conditions of elevated pressure and gradual removal of hydrogen inside the permeation separation device (the feed being outside the polymeric hollow fibers), these hydrocarbons tend to condense within the fiber bundle, blocking the fluid passageways and decreasing the permeation efficiency. Vertical operation of the device uses the force of gravity to facilitate drainage of the condensate from the fiber bundle to the bottom of the device whence it can be easily removed.

When operating with certain liquid feeds, for example, water containing impurities in the form of bicarbonates, sulfates or water containing dissolved gases, similar advantages are gained. Non-condensible gases are more easily freed from interstices in the bundled fibers and can be vented from the top of the device. Vertical operation with liquid feed also helps to cancel out any pockets or dead spaces in the fiber bundle, as the force of gravity tends to urge liquid flow through such areas where horizontal operation might allow settling, salt precipitation and other undesirable developments. The flow-directing devices of the instant invention improve performance in both horizontal and vertical installations.

Treated polyamide hollow fibers are effective to produce potable water in most communities having brackish sulfate water supplies containing more than 250 p.p.m. sulfate impurity level. The hollow fibers can be used to remove a wide variety of other materials from aqueous mixtures. Typical components which can be separated from liquid mixtures containing water using the treated membranes taught herein include inorganic salts containing anions such as sulfate, phosphate, fluoride, bromide, chloride, nitrate, chromate, bromate, carbonate, bicarbonate and thiosulfate, and cations such as sodium, potassium, magnesium, calcium, ferrous, ferric manganous and cupric; organic materials such as glucose, phenols, sulfonated aromatics, lignin, alcohols and dyes; and difficultly filterable insoluble materials including viruses and bacteria such as coliform and aerogene. Specific applications for these separations include the purification of saline brackish and waste waters; recovery of minerals from sea water; water softening, artificial kidney; sterilization; isolation of virus and bacteria; fractionation of blood; and concentration of alkaloids, glucosides, serums, hormones, vitamins, vaccines, amino acids, antiserums, antiseptics, proteins, organometallic compounds, antibiotics, fruit and vegetable juices, sugar solutions, milk, and extracts of coffee and tea, as well as many others.

Preferably the treated hollow fiber membranes described herein are used to purify water containing one or more dissolved inorganic salts, and most preferably sulfate or phosphate salts.

It will be understood that the rate of water permeation in aqueous systems is proportional to the difference between the applied pressure and permeate outlet pressure minus the osmotic pressure of the solution. Thus high applied pressure and low outlet pressure will promote high permeation rate. Rate is usually expressed as gallons per sq. ft. of fiber surface per day. Performance is frequently measured in terms of percent salt rejection, a high figure indicating a high degree of purification. Another frequently used performance measure is conversion—the proportion of the feed volume which exits from the apparatus as permeate product. Conversion can be controlled to a large extent by controlling the outflow of rejected feed.

Because of flow resistance in the fiber bundle inside the jacket of the permeation device there is a pressure drop from the feed point to the point where rejected feed exits. In general it is desired that this pressure drop be quite low in order to minimize mechanical wear and attrition on the fibers. A pressure letdown device is commonly used between the perforated collection tube outlet and the atmosphere.

In the comparative examples which follow, the feed fluid used was an aqueous solution of sulfate salts, called "mixed sulfates" of the following composition:

.75 grams per liter of sodium sulfate
.75 grams per liter of magnesium sulfate

Comparative runs were made using 4"-diameter permeation devices having the features described in the table below. The centrally installed, perforated exit tube was ½ inch in diameter and had 50 $\frac{1}{32}$"-diameter holes evenly spaced (2 holes around, on 3-inch centers) for a 75" length. The fiber bundle was tightly bound with a cloth "surgitube" which squeezed the bundle and held it tightly against the central tube, leaving an annulus of about ¼ inch between the fiber bundle and the shell. The following data were obtained:

| | Condition and type of permeation apparatus employed | Pressure drop, ΔP, feed to reject exit, lbs./sq. in. | Conversion, percent of permeate compared to fluid feed (vol.) | Flux Q, gals./ days/ sq. ft. | Salt rejection SR, percent |
|---|---|---|---|---|---|
| 1 | No perforated exit tube and no annular space. | 7.5 | 49 | .068 | 83.0 |
| 2 | Perforated exit tube and annular space present. | 10 | 51 | .067 | 93.0 |
| 3 | Same as No. 2 | 13 | 64 | .064 | 90.7 |
| 4 | Same as No. 2 | 12 | 75 | .062 | 88.0 |

These data show a 10% improvement in percent salt rejection at the same conversion when radial flow is induced by installation of a perforated center reject receiver tube and provision of an outer feed annulus. Also, even with a 50% increase in conversion, salt rejection is seen to be improved from 83.0 percent to 88 percent.

Figure 2:
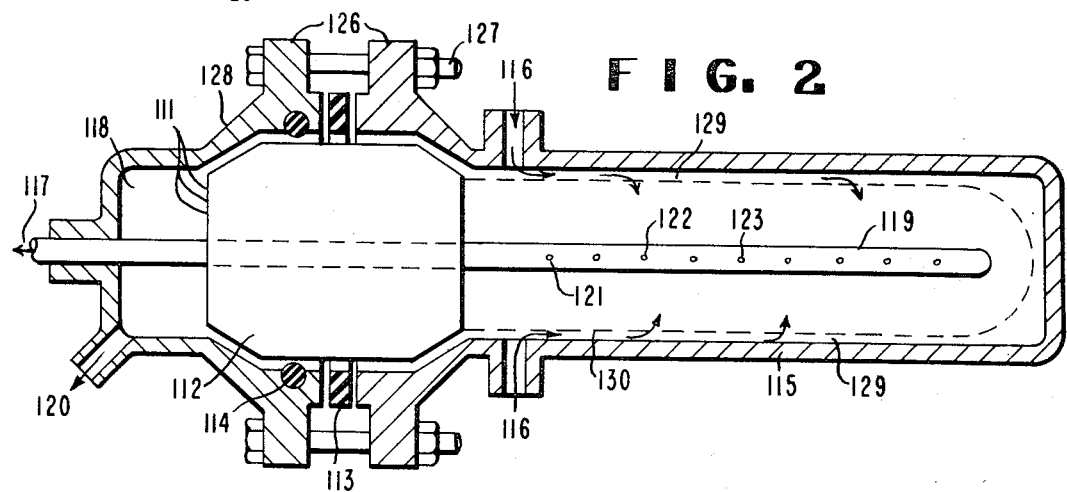
FIG. 2 is a longitudinal cross-sectional view of another embodiment of a permeation separation apparatus of this invention.

Alternative embodiments of the apparatus of this invention are depicted in FIGS. 2–5. FIG. 2 depicts the same permeation separation apparatus as shown in FIG. 1 except that the perforated exit tube exits from the jacket of the apparatus through the cast wall member rather than through the opposite end of the jacket. Referring to FIG. 2 in greater detail, the plurality of individual hollow fibers which are looped back within the jacket to extend through cast wall member 112 are not shown, but rather the hollow fiber bundle which includes the fibers and the elongated flexible sleeve surrounding the fibers is depicted by the dotted line which represents the outermost portion of fiber bundle 130. The fiber bundle is separated from jacket 115 by annular space 129. In operation, fluid feed passes into the interior of the jacket through inlets 116 where it flows along the annular space and then radially across the fibers within the fiber bundle to perforated exit tube 119 where the fluid reject enters the perforations, which are partially numbered 121, 122 and 123, in the tube and out the open exit end of the tube at 117. The permeate having penetrated the fiber walls flows through the hollow fiber interior and exits through the open ends of the fibers at 111 into chamber 118 and leaves the chamber at exit conduit 120. Flanges 126 and bolts 127 provide connecting means between outer closure member 128 and jacket 115, while gasket seal 113 and O-ring 114 provide fluid-tight seals.

Figure 3:
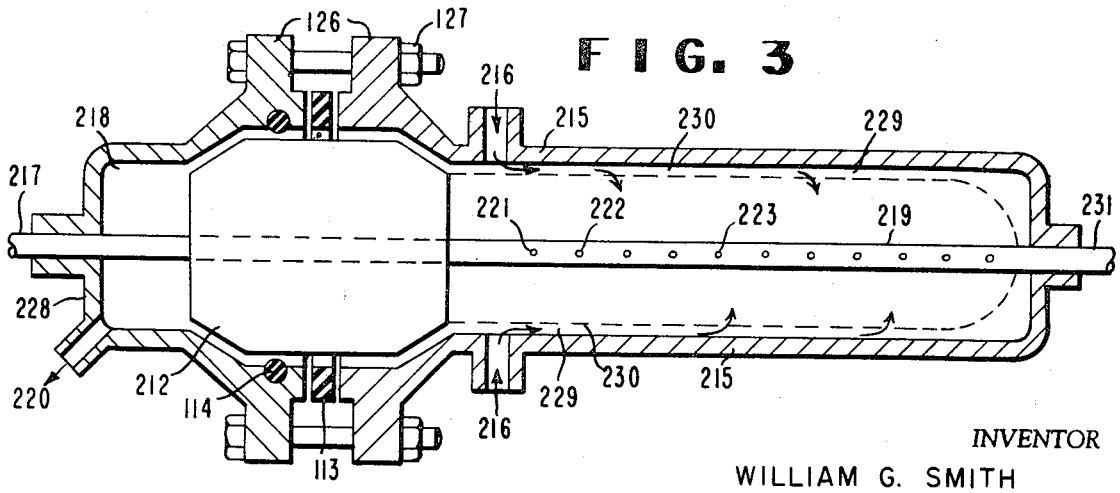
FIG. 3 is a longitudinal cross-sectional view of another embodiment of a permeation separation apparatus of this invention.

FIG. 3 represents another embodiment of the apparatus of this invention and depicts the same permeation separation apparatus as shown in FIG. 1 except that the perforated exit tube exits from the jacket through both the cast wall member and the opposite end of the jacket. As with FIG. 2, the plurality of individual hollow fibers which are looped back within the jacket to extend through the cast wall member 212 are not shown, but rather the hollow fiber bundle which includes the fibers and the elongated flexible sleeve surrounding the fibers is depicted by the dotted line which represents the outermost portion of fiber bundle 230. The fiber bundle is separated from jacket 215 by annular space 229. In operation, the fluid feed passes into the interior of the jacket through inlets 216 where it flows along the annular space and then radially across the fibers within the fiber bundle to perforated exit tube 219, where the fluid reject enters perforations which are partially numbered 221, 222 and 223, and out the open exit ends of the tube at 217 and 231. The permeate, after permeating through the fiber walls, exits though the open ends of the fibers into chamber 218 and leaves the chamber at exit conduit 220. Flanges 126 and bolts 127 provide connecting means between outer closure member 228 and jacket 115, while gasket seal 113 and O-ring 114 provide fluid-tight seals.

Figure 4:
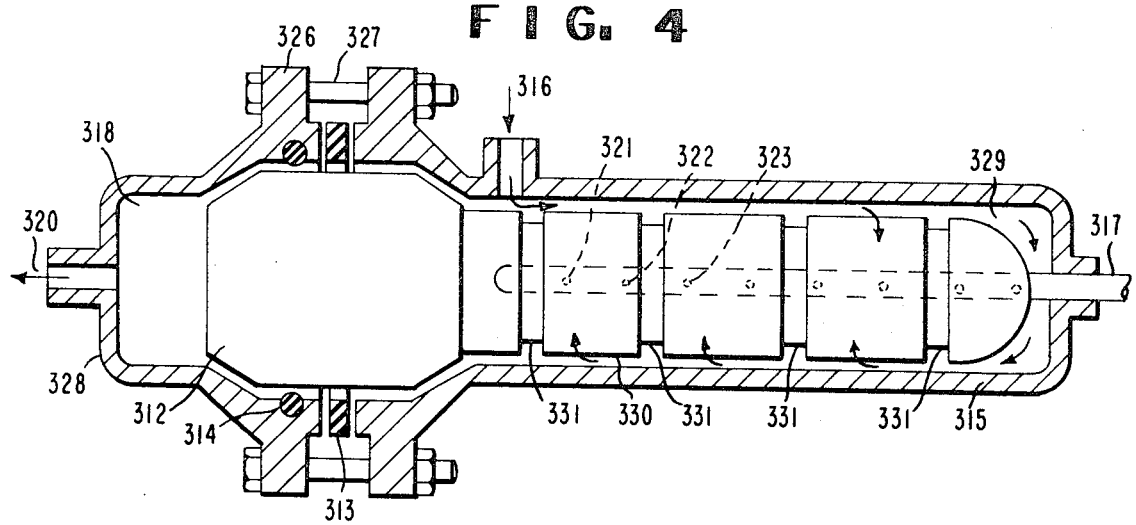
FIG. 4 is a longitudinal cross-sectional view of still another embodiment of a permeation separation apparatus of this invention.

FIG. 4 describes an embodiment of the invention in which strappings such as metal, rope, expandible and compressible elastic materials, have been circularly and tightly placed around the fiber bundle 330 to form indentations as is shown at 331. These indentations help break up fluid flow along the annular ring depicted at 329. Operation of the device of FIG. 4 is otherwise identical to that of the device depicted in FIG. 1. Specifically, the plurality of individual hollow fibers within the fiber bundle is depicted at 330, and the fiber bundle is separated from jacket 315 by annular space 329. Fluid feed enters the interior of the jacket at 316 through the annular space across the fibers to perforated exit tube 319, where it enters perforations, which are partially numbered 321, 322, and 323, and exists through outlet 317. The permeate, after passing through the fiber walls, empties into chamber 318 and can be drawn off through outlet 320. Flanges 326 and bolts 327 fasten outer chamber member 328 and jacket 315. O-ring 314 and gasket 313 provide fluid-tight seals.

Figure 5:
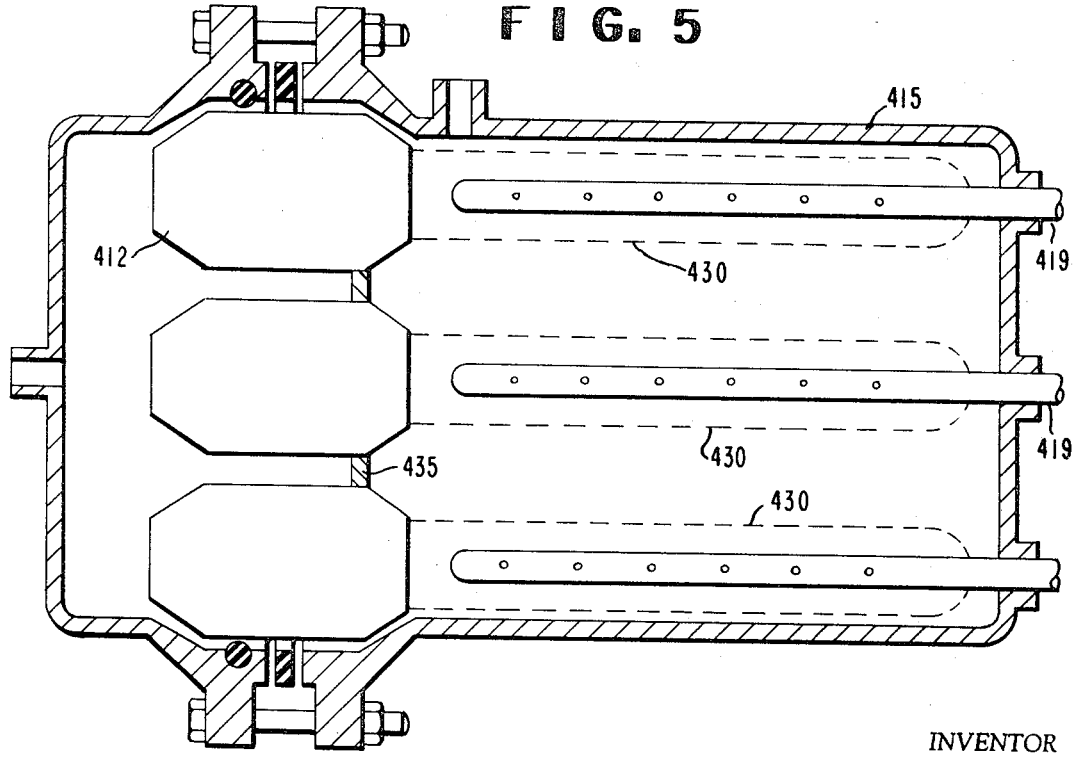
FIG. 5 is a longitudinal cross-sectional view of still another embodiment of a permeation separation apparatus of this invention.

FIG. 5 describes a permeation separation device which operates the same as the embodiments described in FIG. 1, the only difference being that in the FIG. 5 embodiment several, specifically, three, separate fiber bundles 430 are within the jacket 415. Each bundle has a perforated exit tube 419 within its center and the ends of the fibers within each bundle extend through the cast wall members 412 which are rigidly held within the apparatus by plate 435.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An apparatus for separating permeable components of a fluid which apparatus comprises in combination:
   (A) an elongated fluid-tight jacket, having an open first end and a second end closed by said jacket,
       said first end closed by a fluid-tight cast wall member;
   (B) a plurality of selectively permeable hollow fibers positioned longitudinally within said elongated jacket,
       said fibers extending substantially the length of said jacket and forming a loop adjacent the second closed end of said jacket with both ends of each of said fibers embedded in and extending through said cast wall member in fluid-tight relationship thereto,
       said fibers comprising a bundle maintained as a coherent unit by at least one elongated flexible porous sleeve member;
   (C) an outer closure member cooperating with said jacket and said cast wall member which, with said cast wall member, defines a chamber that is in communication with the open ends of each hollow fiber;
   (D) a multiply perforated tube extending through at least one end of said jacket in fluid-tight relationship thereto, said tube positioned within said bundle along approximately the center axis of said bundle and extending substantially the longitudinal length of said bundle,
       the perforations of said perforated tube being spaced around the circumference of said tube and along the length of the portion of said tube that is within said bundle,
       said tube constructed and arranged such that its interior communicates with the interior of said jacket only at the openings provided by said perforations, and such that its interior does not communicate with the chamber defined by said closure member and said cast wall member;
   (E) conduit means on said jacket to permit movement of fluid between an area adjoining the interior walls of said jacket, and an area outside said jacket; and
   (F) conduit means on said outer closure member to permit movement of fluid out of the chamber defined by said outer closure member and said cast wall member;
   (G) said fiber bundle positioned within said jacket such that the elongated flexible porous sleeve surrounding said fibers is spaced away from the interior walls of said jacket.

2. The apparatus of claim 1 wherein the perforated tube extends into the jacket through said second end of the jacket and terminates within the jacket.

3. The apparatus of claim 1 wherein the perforated tube extends into said jacket through the cast wall member and terminates within the jacket.

4. The apparatus of claim 1 wherein the perforated tube extends into the jacket through both said ends of the jacket.

5. The apparatus of claim 1 wherein the perforated tube extends into the jacket through said second end of the jacket and terminates within said jacket, and wherein the perforations on the perforated tube are approximately the same diameter and are approximately evenly spaced around the circumference of said tube and along the length of the portion of said tube that is within the bundle.

6. The apparatus of claim 5 wherein said perforations are sized and spaced to provide an approximately equal fluid pressure drop between the pressure of a fluid entering said jacket at said conduit means on the jacket and the pressure of the fluid at each perforation.

7. The apparatus of claim 6 wherein the elongated flexible porous sleeve member tightly constrains the fibers within the sleeve member.

8. The apparatus of claim 6 wherein the hollow fibers have outside diameters of between about 10–250 microns and wall thicknesses of between 2–75 microns and in which the ratio of the cross-sectional area of the internal bore of each fiber to the total cross-sectional area within the outside perimeter of each fiber is between 0.12:1 to 0.06:1.

9. Process for separating components of a fluid mixture or solution which comprises:
   passing said fluid mixture or solution into the space defined in part (G) of the apparatus defined in claim 1
   forcing said fluid from said space into intimate contact with the outsides of the hollow fibers defined in part (B) of claim 1, whereby permeable components of said fluid mixture or solution pass through the walls of said fibers, and
   forcing the fluid that does not pass through the walls of said fibers into the tube defined in part (D) of claim 1.

10. An apparatus for separating permeable components of a fluid which apparatus comprises in combination:
    (A) an elongated fluid-tight jacket, having an open first end and a second end closed by said jacket,
        said first end closed by a fluid-tight cast wall member;
    (B) a plurality of selectively permeable hollow fibers positioned longitudinally within said elongated jacket, said fibers extending substantially the length of said jacket and forming a loop adjacent the second closed end of said jacket with both ends of each of said fibers embedded in and extending through said cast wall member in fluid-tight relationship thereto, said fibers comprising a bundle maintained as a coherent unit by restraining means;

(C) an outer closure member cooperating with said jacket and said cast wall member which, with said cast wall member, defines a chamber that is in communication with the open ends of each hollow fiber;

(D) a multiply perforated tube extending through at least one end of said jacket in fluid-tight relationship thereto, said tube positioned within said bundle along approximately the center axis of said bundle and extending substantially the longitudinal length of said bundle, the perforations of said perforated tube being spaced around the circumference of said tube and along the length of the portion of said tube that is within said bundle, said tube constructed and arranged such that its interior communicates with the interior of said jacket only at the openings provided by said perforations, and such that its interior does not communicate with the chamber defined by said outer closure member and said cast wall member;

(E) conduit means on said jacket to permit movement of fluid between an area adjoining the interior walls of said jacket, and an area outside said jacket; and (F) conduit means on said outer closure member to permit movement of fluid out of the chamber defined by said outer closure member and said cast wall member;

(G) said fiber bundle positioned within said jacket such that the restraining means maintaining such bundle as a coherent unit is spaced away from the interior walls of said jacket.

References Cited

UNITED STATES PATENTS 3,226,915    1/1966    Pinney _____ 55—158

REUBEN FRIEDMAN, Primary Examiner

R. BARNES, Assistant Examiner

U.S. Cl. X.R.

210—321

PO-1050
(5/69)

UNITED STATES PATENT OFFICE
CERTIFICATE OF CORRECTION

Patent No. 3,526,001  Dated August 25, 1970

Inventor(s) William G. Smith

It is certified that error appears in the above-identified patent and that said Letters Patent are hereby corrected as shown below:

Column 12, line 13, before "closure" insert -- outer --.

Column 12, line 54, change "0.06" to -- 0.60 --.

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents